(12) United States Patent
Babicki et al.

(10) Patent No.: US 12,071,993 B2
(45) Date of Patent: Aug. 27, 2024

(54) BRAKE ACTUATOR

(71) Applicant: Goodrich Corporation, Charlotte, NC (US)

(72) Inventors: Kamil Babicki, Chrząstawa Mała (PL); Maciej Krulak, Warsaw (PL); Artur Luber, Ścinawka Górna (PL)

(73) Assignee: GOODRICH CORPORATION, Charlotte, NC (US)

( * ) Notice: Subject to any disclaimer, the term of this patent is extended or adjusted under 35 U.S.C. 154(b) by 156 days.

(21) Appl. No.: 17/230,407

(22) Filed: Apr. 14, 2021

(65) Prior Publication Data

US 2021/0356009 A1 Nov. 18, 2021

(30) Foreign Application Priority Data

May 12, 2020 (EP) .................................... 20461535

(51) Int. Cl.
| | |
|---|---|
| *F16D 65/54* | (2006.01) |
| *B64C 25/44* | (2006.01) |
| *F16D 65/18* | (2006.01) |
| F16D 121/04 | (2012.01) |
| F16D 125/06 | (2012.01) |
| F16D 127/02 | (2012.01) |

(52) U.S. Cl.
CPC .............. *F16D 65/54* (2013.01); *B64C 25/44* (2013.01); *F16D 65/18* (2013.01); *F16D 2121/04* (2013.01); *F16D 2125/06* (2013.01); *F16D 2127/02* (2013.01)

(58) Field of Classification Search
CPC .... F16D 65/54; F16D 65/0087; F16D 65/183; F16D 2121/04; F16D 55/40; F16D 2127/02; F16D 65/18; F16D 2125/06; B64C 25/44; F16F 1/426; F16F 1/34; F16F 2236/025
USPC ........................................................ 188/71.8
See application file for complete search history.

(56) References Cited

U.S. PATENT DOCUMENTS

| | | | | |
|---|---|---|---|---|
| 2,548,868 | A | * | 4/1951 | Christenot ............ F16D 65/546 188/79.62 |
| 3,575,268 | A | * | 4/1971 | Kimata ................... F16D 65/54 188/196 P |

(Continued)

FOREIGN PATENT DOCUMENTS

| | | | | |
|---|---|---|---|---|
| DE | 2349734 | | 4/1975 | |
| DE | 2722620 | A1 * | 11/1978 | ....... F16D 55/22655 |

(Continued)

OTHER PUBLICATIONS

EPO, Extended European Search Report dated Sep. 2, 2020 in EP Application No. 20461535.5.

*Primary Examiner* — Nicholas J Lane
*Assistant Examiner* — Stephen M Bowes
(74) *Attorney, Agent, or Firm* — SNELL & WILMER L.L.P.

(57) ABSTRACT

A latching mechanism for a brake actuator is provided. The latching mechanism comprising an annular flange and a plurality of resilient elements extending radially inwardly from the annular flange. Each of the plurality of resilient elements comprises a U-shaped cross-section and a tooth on a radially inner end. The tooth is configured to conform to and engage with ratchet teeth of a wear compensation sleeve of a brake actuator.

13 Claims, 2 Drawing Sheets

(56) References Cited

U.S. PATENT DOCUMENTS

| | | | | |
|---|---|---|---|---|
| 3,926,283 A | * | 12/1975 | Crossman | ............... F16D 55/40 |
| | | | | 188/196 B |
| 4,433,758 A | | 2/1984 | Crossman | |
| 4,529,068 A | | 7/1985 | Gallo | |
| 5,542,504 A | * | 8/1996 | Berwanger | ............. F16D 65/54 |
| | | | | 188/71.8 |
| 7,731,001 B1 | * | 6/2010 | Mackiewicz | ........... F16D 65/14 |
| | | | | 188/72.3 |
| 2005/0103581 A1 | * | 5/2005 | Boisseau | ................. F16D 65/54 |
| | | | | 188/72.4 |
| 2006/0272904 A1 | | 12/2006 | Soellner | |
| 2016/0176518 A1 | * | 6/2016 | Eyanga | ................... F16D 65/18 |
| | | | | 188/151 R |

FOREIGN PATENT DOCUMENTS

| | | | | | |
|---|---|---|---|---|---|
| EP | 0822351 | | 2/1998 | | |
| FR | 1146681 A | * | 11/1957 | ............. | F16D 65/54 |
| FR | 2281860 A | * | 4/1976 | ............. | B60T 17/08 |
| FR | 3030663 A1 | * | 6/2016 | ............. | F16D 55/40 |
| GB | 1327326 A | * | 8/1973 | ............. | F16D 65/54 |

\* cited by examiner

BRAKE ACTUATOR

CROSS-REFERENCE TO RELATED APPLICATIONS

This application claims priority to, and the benefit of, EP Patent Application No. 20461535.5, filed May 12, 2020 and titled "BRAKE ACTUATOR," which is incorporated by reference herein in its entirety for all purposes.

FIELD

The present disclosure relates to a brake actuator for use, for example, in a braking system for an aircraft, e.g., a wheel thereof.

BACKGROUND

Braking systems for aircraft wheels typically comprise a stack of alternating static and rotary brake discs. One or more brake actuators are mounted to a static structure at an end of the brake disc stack and are operated to apply a force to the disc stack to bring the static and rotary brake discs into frictional contact, thus applying a braking force to the wheel. The actuator typically comprises a piston slidably mounted in a housing. Hydraulic fluid is admitted into the housing to urge the piston towards the brake disc stack. A spring returns the piston to its original position when the force from the hydraulic fluid is no longer applied so as to ensure that the piston is properly disengaged from the brake discs.

With time, the brake discs wear down, meaning that the travel required of the piston increases, leading to reduced responsiveness in the braking system.

It is therefore desirable to provide an actuator which compensates for this wear and which provides consistent travel of the piston as the brake discs wear down.

SUMMARY

According to one embodiment of the present disclosure, there is provided a latching mechanism for a brake actuator. The latching mechanism comprises an annular flange and a plurality of resilient elements extending radially inwardly from the annular flange, wherein each of the plurality of resilient elements comprises a U-shaped cross-section and a tooth on a radially inner end, wherein the tooth is configured to conform to and engage with ratchet teeth of a wear compensation sleeve of a brake actuator.

Each of the plurality of resilient elements may comprise a radially inner leg and a radially outer leg joined by a base, and the tooth may extend radially inwardly from the radially inner leg. The base may be curved.

The radially outer leg may be connected to a radially inner end of the annular flange.

The radially inner and outer legs may extend axially and may be substantially parallel to each other, and the tooth may be disposed at an end of the radially inner leg opposite the base.

The plurality of resilient elements may be spaced around the annular flange (e.g., the circumferential distance between each adjacent resilient element may be the same).

The plurality of resilient elements may comprise between two and twenty resilient elements, for example twelve resilient elements. Two to twenty resilient elements is possible and achieves the technical effects set out herein, for example two positioned diametrically. More refined embodiments include between six and twelve resilient elements.

According to another embodiment of the present disclosure, there is provided a brake actuator for an aircraft braking system. The brake actuator comprises a housing having an internal bore, a sleeve mounted for axial movement within the internal bore of the housing, the sleeve having a plurality of ratchet teeth on an external surface thereof, and a piston slidable along the axis, the piston comprising a pin portion mounted within the internal bore of the housing and extending axially through the sleeve, a piston head disposed at a first axial end of the piston, and a cap disposed at a second end of the piston for operative engagement with a brake element, wherein the pin portion is mounted so as to be movable axially relative to the sleeve between a first position in which the piston head is drivingly engaged with the sleeve for urging the sleeve in a first direction along the internal bore of the housing, and a second position in which the piston head is drivingly disengaged from the sleeve. The brake actuator also comprises the latching mechanism of any of the above embodiments. The latching mechanism is mounted to the housing and circumscribing the sleeve, each tooth of the plurality of resilient elements engaging the ratchet teeth of the sleeve, wherein each tooth of the plurality of resilient elements and the ratchet teeth of the sleeve are shaped or configured to engage such that, in use, the sleeve is able to move and/or ratchet forward in the first axial direction but is prevented from moving back in the second axial direction by the engagement of the resilient elements and the ratchet teeth.

The latching mechanism may be retained against the housing by a retaining element.

The retaining element may comprise a nut threadably engaged with a thread on an outer surface of the housing.

The annular flange may be retained against a radially extending end surface of the housing by the retaining element.

A or the radially outer leg of each of the plurality of resilient elements may be retained against an axially extending inner surface of the housing.

The annular flange may comprise one or more keys extending from the annular flange to locate the annular flange in the housing and prevent movement of the annular flange relative to the housing.

The brake actuator may further comprise a resilient member, for example a compression spring, arranged between the piston head and the sleeve for biasing the piston head axially away from the sleeve.

The resilient member may circumscribe the pin portion and extend into a bore formed in the sleeve.

A spring force of the plurality of resilient elements may be greater than a force required to compress the resilient member, such that the sleeve is able to move and/or ratchet forward in the first axial direction only after the piston head has moved into driving engagement with the sleeve.

The pin portion may comprise a retaining element extending radially therefrom for engaging a wall of the sleeve in the second position, the retaining element configured to prevent the resilient member from biasing the cap beyond a predetermined rest position.

The retaining element may be a circlip received in a circumferentially extending groove in the pin portion, or the retaining element may be at least one flange extending radially from and at least partially circumscribing the pin portion.

BRIEF DESCRIPTION OF THE DRAWINGS

Some exemplary embodiments and features of the present disclosure will now be described by way of example only, and with reference to the following drawings in which.

DETAILED DESCRIPTION

Figure 1:
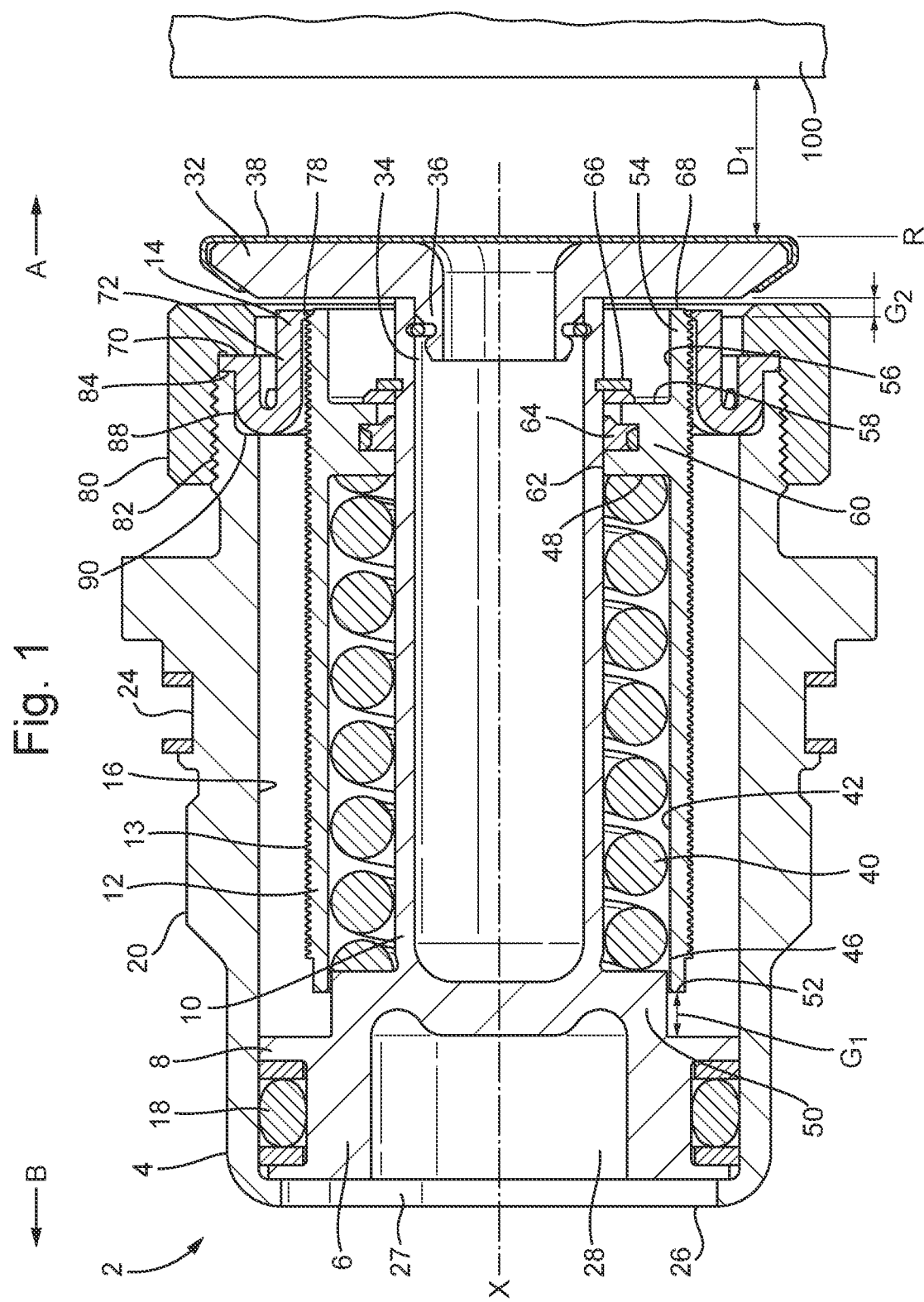
FIG. 1 shows a cross-sectional view of a brake actuator in accordance with the disclosure.

With reference to FIG. 1, a brake actuator 2 according to an embodiment of the present disclosure is illustrated.

The brake actuator 2 comprises a housing 4 which receives a piston 6 having a longitudinal piston axis X and which in use applies a braking force to a brake element 100 such as a brake disc in an aircraft braking system.

The piston 6 comprises a piston head 8 located at a first end thereof, and a pin portion 10 extending axially from the piston head 8 to a second end of the piston 6. The piston head 8 may be fixed, for example by welding, to the pin portion 10. Alternatively, the piston head 8 and pin portion 10 may be a single unitary piece.

The brake actuator 2 further comprises a sleeve 12 having ratchet teeth 13 formed along an external (e.g., outer cylindrical) surface of the sleeve 12. The pin portion 10 extends co-axially through the sleeve 12. The pin portion 10 is also slidably received in the sleeve 12. The brake actuator 2 further comprises a latching mechanism 14 for maintaining an axial position of the sleeve 12 in the housing 4.

The piston head 8 is slidably mounted in an internal bore 16 of the housing 4. A sliding seal 18, for example an O-ring, may surround the piston head 8 for slidably sealing the piston head 8 against the internal bore 16 of the housing 4. The housing 4 may, as shown, be provided with an external thread 20 for mounting the housing 4 in a hydraulic fluid supply cavity, which supplies pressurized hydraulic fluid to the piston head 8 to move the piston head 8 axially along the internal bore 16 of the housing 4. The housing 4 may also be provided with a circumferential groove 24 for receiving an external seal, for example an O-ring, for sealing the housing 4 (e.g., an outer surface thereof) with the hydraulic fluid supply cavity. An axial end 26 of the housing 4 may define one or more openings 27 for admitting hydraulic fluid (e.g., from the hydraulic fluid supply cavity) into a cavity 28 in the housing 4, wherein the cavity 28 is located between the axial end 26 of the housing 4 and the piston head 8. The pressurization of hydraulic fluid in the cavity 28 may apply a braking force to the piston head 8. The cavity 28 may be provided by a bore in the piston head 8.

The piston 6 further comprises a cap 32 disposed at the second end thereof, which is sometimes referred to in the art as an insulator. The cap 32 may be responsible for transmitting load from the piston to the brake element 100, as discussed below. The pin portion 10, as shown, may include a bore 34 into which a portion or projection 36 of the cap 32 may be mounted. Alternatively, the cap 32 may comprise a bore or through hole into which a portion of the second end of the pin portion 10 is mounted. The cap 32 may be threadably engaged with the second end of the pin portion 10 or retained by any other suitable means. The piston 6 is operatively engaged with the brake element 100 via the cap 32.

The cap 32 comprises a brake surface 38. In use, the brake surface 38 faces the brake element 100 and, when the hydraulic fluid admitted into the cavity 28 of the housing 4 is pressurized, moves into contact with the brake element 100 to transmit a braking force to the brake element 100.

A resilient member 40 (e.g., a spring) is provided to bias the piston head 8 such that the piston 6 is biased in a direction away from the brake element 100. The spring 40 may, as shown, be a preloaded compression spring 40. The spring 40 may extend between the piston head 8 and a portion of the sleeve 12, as shown in FIG. 1. In the illustrated embodiment, the spring 40 is a coil spring circumscribing the pin portion 10.

The sleeve 12 extends axially between a first sleeve end 46 proximate the piston head 8 and a second sleeve end 54 proximate the cap 32. A first bore 42 is formed in the first sleeve end 46 of the sleeve 12. The first bore 42 extends to and terminates at a first bore end surface 48 within the sleeve 12. The spring 40 extends between the piston head 8 and the first bore end surface 48. The spring 40 may be connected to a shoulder 50 of the piston head 8 which, along with the piston head 8, is slidably received in the first bore 42 of the sleeve 12.

When force is not substantially applied to the piston head 8 by the hydraulic fluid (i.e., when the system is not pressurized and/or at rest), the force exerted by the spring 40 biases the piston head 8 away from the sleeve 12. This maintains a first axial gap $G_1$ between the piston 6 and the sleeve 12, more specifically between the piston head 8 and an opposing first sleeve end surface 52 of the sleeve 12 at the first sleeve end 46.

The force exerted by the spring 40 also biases the cap 32 towards the second sleeve end 54. The sleeve 12 may, as shown, be provided with a second bore 56 in the second sleeve end 54. The second bore 56 extends to and terminates at a second bore end surface 58 within the sleeve 12. A portion of the cap 32 may be slidably received within the second bore 56. The first bore end surface 48 and the second bore end surface 58 may be provided on opposing sides of a portion 60 of the sleeve 12 extending radially inwardly, as shown. The radial portion 60 includes an inner circumferential surface 62 that defines a hole through which the pin portion 10 extends. A seal 64 may be provided adjacent to the hole, which is configured to seal against the pin portion 10 as the pin portion 10 slides through the hole.

The pin portion 10 may be provided in connection with a retaining element 66. The retaining element 66 protrudes radially from the pin portion 10 to provide a stop surface. In use, the stop surface is configured to abut the radial portion 60 (e.g., the second bore end surface 58 thereof). This prevents the spring 40 from biasing the cap 32 beyond a predetermined rest position R, as shown in FIG. 1. The pin portion 10 may be provided with a circumferentially extending groove into which the retaining element 66, for example a circlip, is received. The retaining element 66 may alternatively be any suitable means for retaining the pin portion 10 against the sleeve 12, for example a flange extending radially from and circumscribing the pin portion 10, or multiple distinct flanges extending radially from and equidistantly spaced around the pin portion 10.

When force is not substantially applied to the piston head 8 by the hydraulic fluid (i.e., when the system is not pressurized and/or at rest), the spring 40 biases the piston 6 away from the brake element 100. This causes the retaining element 66 to be urged against the radial portion 60 (e.g., the second bore end surface 58), providing a stop surface and preventing the cap 32 from moving any further away from the brake element 100. Thus, a second axial gap $G_2$ is maintained between the cap 32 and the sleeve 12, for example between an opposing second sleeve end surface 68 of the sleeve 12 at the second sleeve end 54.

As discussed above, a braking force is applied by pressurising hydraulic fluid in the cavity 28 of the housing 4, which causes an axial force to be applied to the piston head 8. The force exerted by the fluid on the piston head 8 urges the piston head 8 axially against the biasing force of the spring 40 towards the first sleeve end 46. This reduces the first axial gap $G_1$ between the piston head 8 and the first sleeve end surface 52. The motion of the piston head 8 is transmitted via the pin portion 10 to the cap 32, such that the cap 32 is urged away from the second sleeve end surface 68 and towards the brake element 100, which increases the second axial gap $G_2$.

As will be appreciated, for the purposes of the present disclosure the important axial gap is the first axial gap $G_1$, and its connection with the distance $D_1$, which is discussed in more detail below.

If prior to any force being applied to the piston head 8 by the hydraulic fluid (i.e., when the system is not pressurised and/or at rest) a distance $D_1$ between the brake surface 38 of the cap 32 and the brake element 100 (i.e., the operational travel of the cap 32) is less than the length of the first axial gap $G_1$, then the mechanism will operate normally. That is, the hydraulic fluid may be pressurised in the cavity 28 of the housing 4, which causes a force to be applied to the piston head 8. When the force applied to the piston head 8 by the pressurised hydraulic fluid is greater than the resting compressive force applied to the piston head 8 by the spring 40 (which acts in the opposite direction), the piston head 8 will move in a first axial direction A so as to urge the brake surface 38 of the cap 32 against the brake element 100. This applies the braking force thereto without the piston head 8 coming into contact with the sleeve 12, for example the first sleeve end surface 52.

When the force from the hydraulic fluid is subsequently removed (i.e., when the system is depressurized), the spring 40 will urge the piston head 8 in an opposing second axial direction B away from the brake element 100, and the retaining element 66 will be urged back against the second bore end surface 58 of the sleeve 12, returning the cap 32 to its rest position R, as shown in FIG. 1.

In other words, if at rest the distance $D_1$ between the brake surface 38 of the cap 32 and the brake element 100 is less than or equal to the length of the first axial gap $G_1$, no force will be transmitted to the sleeve 12 by engagement with the piston head 8.

However, prior to any force being applied to the piston head 8 by the pressurized hydraulic fluid, the distance $D_1$ between the brake surface 38 of the cap 32 and the brake element 100 may be greater than the length of the first axial gap $G_1$. This may occur, for example, when the brake element 100 wears and reduces in thickness in use. In this situation, when the hydraulic fluid is pressurized in the cavity 28 of the housing 4, applying a force on the piston head 8, the piston head 8 will move in the first axial direction A as before, but before the brake surface 38 of the cap 32 reaches the brake element 100, the first axial gap $G_1$ will reduce to zero. As such, the piston head 8 will move into driving engagement with the sleeve 12, for example the first sleeve end surface 52 thereof. The sleeve 12 will then be moved axially with the piston head 8 in the first axial direction A, until the brake surface 38 of the cap 32 comes into contact with the brake element 100 and applies the braking force. When the force from the pressurized hydraulic fluid is removed, the spring 40 will urge the piston head 8 back in the opposing second axial direction B as before, and the retaining element 66 will be urged back against the sleeve 12, e.g., the second bore end surface 58 thereof.

However, as will be described further below, the latching mechanism 14 prevents movement of the sleeve 12 in the second direction B such that the sleeve 12 remains in a new axial position. The cap 32 will therefore not move back to its original rest position R as shown in FIG. 1, but will instead be held in a new rest position closer to the brake element 100.

In other words, the actuator 2 operates differently if the distance $D_1$ between the brake surface 38 of the cap 32 and the brake element 100 (when the system is not pressurized and/or at rest) is greater than the length of the first axial gap $G_1$. In this situation, the force of the pressurized hydraulic fluid admitted into the cavity 28 of the housing 4 is also transmitted to the sleeve 12 due to its engagement with the piston head 8, which also urges the sleeve 12 towards the brake element 100. The sleeve 12 will then be retained in a new axial position by the latching mechanism 14, such that the distance $D_1$ between the brake surface 38 of the cap 32 and the brake element 100 is maintained approximately equal to the length of the first axial gap $G_1$ when the force from the pressurized fluid is removed.

The latching mechanism 14 therefore provides an arrangement in which the operational travel of the piston 6 is maintained approximately equal to the length of the first axial gap $G_1$. The size of the first axial gap $G_1$ may therefore be set to provide the desired optimal operational travel of the piston 6, which will then be maintained during use of the brake actuator 2. This improves the reliability and overall effectiveness of the braking system.

Figure 2:
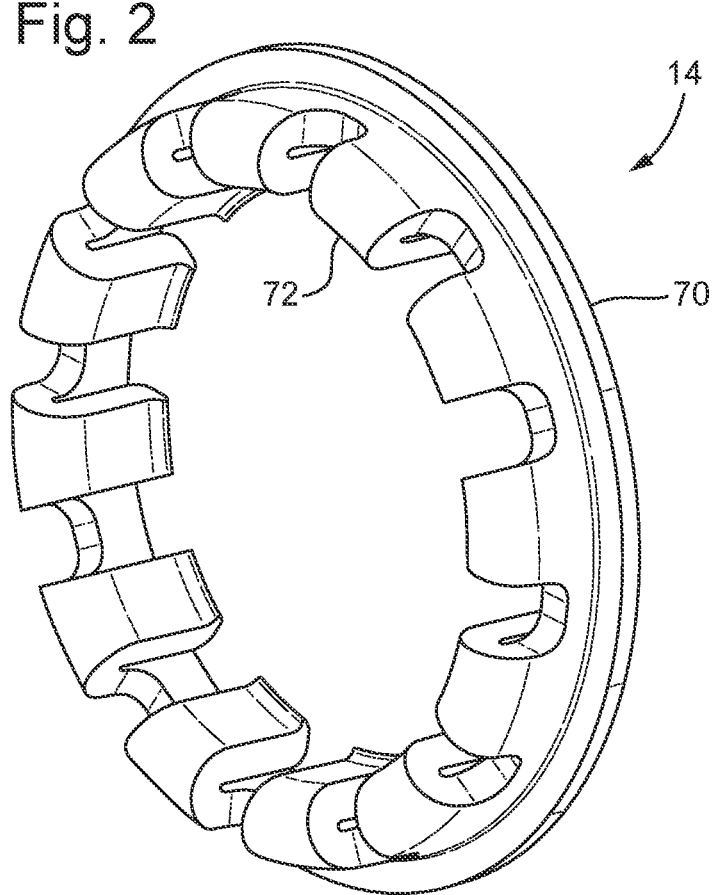
FIG. 2 shows a latching mechanism for use in the actuator of FIGS. 1; and 2
Figure 3:
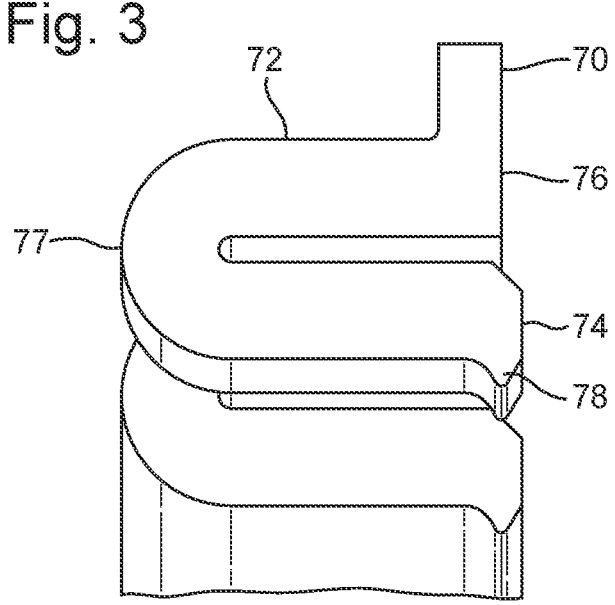
FIG. 3 shows a cross-sectional view of the latching mechanism of FIG. 2.

With reference to FIGS. 2 and 3, the latching mechanism 14 comprises an annular flange 70 and a plurality of resilient elements 72. The resilient elements 72 may extend from a radially inner end of the annular flange 70, such that the annular flange 70 may extend radially outwardly from the plurality of resilient elements 72. The annular flange 70 may be configured as a ring, and a radially outer end thereof may be configured to be mounted to the housing 4 to hold the latching mechanism 14 in position. The plurality of resilient elements 72 are configured to engage with the sleeve 12 to maintain the axial position of the sleeve 12 within the housing 4.

The plurality of resilient elements 72 may be equally spaced (i.e., by a substantially uniform circumferential distance) around the annular flange 70, which balances the forces exerted by the resilient elements 72 in use. The embodiment illustrated in FIG. 2 shows twelve resilient elements 72 disposed equidistantly around the annular flange 70, but a greater or lesser number of resilient elements 72 may also be provided, for example from between two to twenty resilient elements 72, or more specifically between three to ten, or between four to six.

As shown in FIG. 3, the plurality of resilient elements 72 each comprise a substantially U-shaped cross-section. Each of the plurality of resilient elements 72 comprises a radially inner leg 74 and a radially outer leg 76 joined by a curved base 77, thus forming the "U" shape. The inner and outer legs 74, 76 extend axially and may be substantially parallel to each other. The radially outer leg 76 is connected to the radially inner end of the annular flange 70. The radially inner leg 74 comprises a tooth 78 extending radially inwardly therefrom. The tooth 78 may be disposed at an axial end of the radially inner leg 74 (e.g., opposite the curved base 77). The tooth 78 is configured to conform to and engage with the ratchet teeth 13 of the sleeve 12.

The latching mechanism 14 may be retained against the housing 4 by a retaining element 80, for example a nut threadably engaged with the housing 4. The retaining element 80 may be threadably engaged with a thread 82 disposed on an outer surface of the housing 4, as shown. The retaining element 80 may retain the annular flange 70 against a radially extending end surface 84 of the housing 4. The radially outer leg 76 may be retained against an axially extending inner surface 88 of the housing 4. The inner surface 88 of the housing 4 may comprise a radially extending shoulder 90 against which the curved base 77 is retained, as shown. The annular flange 70 may comprise one or more keys configured to locate the annular flange 70 in the housing 4 (not shown). The one or more keys may project radially or axially from the annular flange 70, and may be received in a slot or groove in the housing 4. The one or more keys may ease assembly, and may prevent the latching mechanism 14 from rotating or otherwise moving during operation. This retaining mechanism is shown and described for completeness, but any suitable retaining mechanism may be used and the disclosure is not limited to the use of the retaining element 80 and associated components.

The ratchet teeth 13 on the sleeve 12 and the teeth 78 on each of the plurality of resilient elements 72 are shaped or otherwise configured such that, in use, when a braking force biases the sleeve 12 in the first axial direction A, driving engagement between the ratchet teeth 13 and each tooth 78 causes the ratchet teeth 13 to apply a force on each tooth 78 having both a radial component and an axial component. The axial component of the force acting on each tooth 78 is transferred to the retaining element 80 (e.g., by contact between the annular flange 70 and a rear surface of the retaining element 80). The radial component of the force acting on each tooth 78 acts to urge the radially inner leg 74 radially outwards, which causes the curved base 77 to bend. This moves the tooth 78 away from the ratchet teeth 13 and allows the sleeve 12 to move/ratchet forward in the first axial direction A. However, the ratchet teeth 13 on the sleeve 12 and the teeth 78 on each of the plurality of resilient elements 72 are also shaped or otherwise configured such that when the braking force is removed and the spring 40 biases the sleeve 12 back in the second axial direction B, engagement between the ratchet teeth 13 and each tooth 78 does not cause the radially inner leg 74 to be urged and thus the teeth 78 on each of the plurality of resilient elements 72 hold the sleeve 12 in its new axial position.

In other words, the ratchet teeth 13 and the teeth 78 are shaped or otherwise configured to engage such that the sleeve 12 is able to move/ratchet forward in the first axial direction A towards the brake element 100, but is not able to move back in the second axial direction B away from the brake element 100.

In various embodiments, the spring force of the resilient elements 72 can be greater than the force required to compress the spring 40 to the close the first gap $G_1$, so that the resilient elements 72 do not allow the sleeve 12 to move in the first axial direction A during initial compression of the spring 40, but only after the braking force has been transmitted to the sleeve 12 by contact of the piston head 8 with the sleeve 12. This provides a simple mechanism for preventing unwanted movement of the sleeve 12, although other suitable mechanisms may be used.

The latching mechanism 14 may be manufactured by any suitable method, for example by additive manufacturing, e.g., SLM, or machining.

The disclosed actuator 2 compensates for wear of brake elements by means of a wear compensation sleeve 12 which moves axially relative to the housing 4 in one direction, with movement of the sleeve 12 in the opposing direction being prevented by a latching mechanism 14. The maximum operational extension of the piston 6 corresponds to substantially the full length of the sleeve 12, which may increase the duration of use of the component before needing to be reset or reassembled. All parts are reusable and reassembly is straightforward due to the simplified design and improved accessibility. The latching mechanism 14 is arranged substantially externally of the housing 4, which may improve accessibility and assembly. Maintenance may be performed more easily, without the need for substantial disassembly. Moreover, as the latching mechanism 14 extends substantially axially, this reduces the radial space required for the latching mechanism 14 within the housing 4.

It will be understood that the actuator 2 may have particular application in aircraft braking systems. However, the disclosure is not limited to such applications and may find use in any actuation system which may need to compensate for wear.

Although the figures and the accompanying description describe particular embodiments and examples, it is to be understood that the scope of this disclosure is not to be limited to such specific embodiments, and is, instead, to be determined by the following claims.

What is claimed is:

1. A latching mechanism for a brake actuator, the latching mechanism comprising:
   an annular flange; and
   a plurality of resilient elements extending radially inwardly from the annular flange, wherein each of the plurality of resilient elements comprises a U-shaped cross-section and a tooth on a radially inner end, wherein each of the plurality of resilient elements comprises a radially inner leg and a radially outer leg joined by a curved base, wherein the radially inner leg is longer in length than the radially outer leg, wherein the radially inner leg and the radially outer leg of each resilient element of the plurality of resilient elements extend axially and are substantially parallel to each other thus forming the U-shaped cross section, wherein the tooth of each resilient element of the plurality of resilient elements is disposed at an axial end of the radially inner leg opposite the curved base, and wherein the tooth of each resilient element of the plurality of resilient elements is shaped to conform to and engage with ratchet teeth of a wear compensation sleeve of the brake actuator such that, in use, in response to a force biasing the wear compensation sleeve in a first axial direction, driving engagement between the ratchet teeth and the tooth urges the radially inner leg radially outwards causing the curved base to bend and thus allowing the wear compensation sleeve to move forward in the first axial direction, and in response to a force biasing the wear compensation sleeve in an opposing second axial direction, engagement between the tooth and the ratchet teeth does not cause the radially inner leg to be urged outwards and the tooth prevents the sleeve from moving back in the second axial direction.

2. The latching mechanism of claim 1, wherein the radially outer leg is connected to a radially inner end of the annular flange.

3. The latching mechanism of claim 1, wherein the plurality of resilient elements are spaced equally around the annular flange.

4. The latching mechanism of claim 1, wherein the plurality of resilient elements comprises between two and twenty resilient elements.

5. A brake actuator for an aircraft braking system, the brake actuator comprising:

a housing having an internal bore;

a sleeve mounted for axial movement within the internal bore of the housing, the sleeve having a plurality of ratchet teeth on an external surface thereof;

a piston slidable along the axis, the piston comprising a pin portion mounted within the internal bore of the housing and extending axially through the sleeve, a piston head disposed at a first axial end of the piston, and a cap disposed at a second end of the piston for operative engagement with a brake element, wherein the pin portion is mounted so as to be movable axially relative to the sleeve between a first position in which the piston head is drivingly engaged with the sleeve for urging the sleeve in a first direction along the internal bore of the housing, and a second position in which the piston head is drivingly disengaged from the sleeve; and a latching mechanism comprising an annular flange and a plurality of resilient elements extending radially inwardly from the annular flange, wherein each of the plurality of resilient elements comprises a U-shaped cross-section and a tooth on a radially inner end, wherein each of the plurality of resilient elements comprises a radially inner leg and a radially outer leg joined by a curved base, wherein the radially inner leg is longer in length than the radially outer leg, wherein the radially inner leg and the radially outer leg of each resilient element of the plurality of resilient elements extend axially and are substantially parallel to each other thus forming the U-shaped cross section, wherein the tooth of each resilient element of the plurality of resilient elements is disposed at an axial end of the radially inner leg opposite the curved base, and wherein the tooth of each resilient element of the plurality of resilient elements is shaped to conform to and engage with the ratchet teeth of the sleeve, and the latching mechanism is mounted to the housing and circumscribing the sleeve, each tooth of the plurality of resilient elements engaging one of the plurality of ratchet teeth of the sleeve, wherein each tooth of the plurality of resilient elements and the ratchet teeth of the sleeve are shaped or configured to engage such that, in use, in response to a force biasing the sleeve in a first axial direction, driving engagement between the ratchet teeth and the tooth urges the radially inner leg radially outwards causing the curved base to bend and thus allowing the sleeve to move forward in the first axial direction, and in response to a force biasing the sleeve in an opposing second axial direction, engagement between the tooth and the ratchet teeth does not cause the radially inner leg to be urged outwards and the tooth prevents the sleeve from moving back in the second axial direction.

6. The brake actuator of claim 5, wherein latching mechanism is retained against the housing by a retaining element.

7. The brake actuator of claim 6, wherein the retaining element comprises a nut threadably engaged with a thread on an outer surface of the housing.

8. The brake actuator of claim 6, wherein the annular flange is retained against a radially extending end surface of the housing by the retaining element.

9. The brake actuator of claim 6, wherein the radially outer leg of each resilient element of the plurality of resilient elements is retained against an axially extending inner surface of the housing.

10. The brake actuator of claim 5, wherein the annular flange comprises one or more keys extending from the annular flange to locate the annular flange in the housing and prevent movement of the annular flange relative to the housing.

11. The brake actuator of claim 5, further comprising a resilient member arranged between the piston head and the sleeve for biasing the piston head axially away from the sleeve, the resilient member circumscribing the pin portion and extending into a bore formed in the sleeve.

12. The brake actuator of claim 11, wherein a spring force of the plurality of resilient elements is greater than a force required to compress the resilient member, such that the sleeve is able to move and/or ratchet forward in the first axial direction only after the piston head has moved into driving engagement with the sleeve.

13. The brake actuator of claim 11, wherein the pin portion comprises a retaining element extending radially therefrom for engaging a wall of the sleeve in the second position, the retaining element configured to prevent the resilient member from biasing the cap beyond a predetermined rest position, and wherein the retaining element is a circlip received in a circumferentially extending groove in the pin portion, or wherein the retaining element is at least one flange extending radially from and at least partially circumscribing the pin portion.

* * * * *